United States Patent [19]

Bosse et al.

[11] 4,212,695

[45] Jul. 15, 1980

[54] METHOD OF REINFORCING FLATTENED TUBULAR FILM WITH TAPE LAYERS

[75] Inventors: Frank Bosse, Tecklenburg; Karl-Heinz Lage, Lengerich, both of Fed. Rep. of Germany

[73] Assignee: Windmoller & Holscher, Lengerich, Fed. Rep. of Germany

[21] Appl. No.: 883,314

[22] Filed: Mar. 3, 1978

[30] Foreign Application Priority Data

Mar. 8, 1977 [DE] Fed. Rep. of Germany ....... 2710035

[51] Int. Cl.² ................................................ B29F 3/10
[52] U.S. Cl. .................................... 156/188; 156/198; 156/244.12
[58] Field of Search ............... 156/176, 178, 179, 184, 156/185, 187, 188, 190, 191, 192, 195, 190, 242, 243, 244; 264/173, 176 R, 177 R, 209

[56] References Cited

U.S. PATENT DOCUMENTS

| 2,723,705 | 11/1955 | Collins | 156/195 |
| 3,008,862 | 11/1961 | Haine et al. | 156/244 |
| 3,370,999 | 2/1968 | Schwarzrock | 156/172 |
| 3,371,002 | 2/1968 | Reddeman | 156/244 |
| 3,413,169 | 11/1968 | Krings et al. | 156/244.14 |
| 3,437,537 | 4/1969 | Takada | 156/244.14 |
| 3,444,019 | 5/1969 | Van Leeuwen | 156/184 |
| 3,953,557 | 4/1976 | Brax et al. | 264/173 |
| 3,957,940 | 5/1976 | Schubert et al. | 156/244.11 |

FOREIGN PATENT DOCUMENTS 1928736 5/1962 Fed. Rep. of Germany .
2518341 4/1975 Fed. Rep. of Germany .
1340285 12/1963 France .

Primary Examiner—John E. Kittle
Attorney, Agent, or Firm—Fleit & Jacobson

[57] ABSTRACT

A flattened tube of continuous film is opened up by being fed over a mandrel which is floatingly disposed within the tube. As the tube is passing over the mandrel, which serves as a backing, a layer of reinforcing tapes is helically wound thereabout and fixed thereto, whereafter the tube is flattened again. Each side of the tube is then successively provided with a layer of parallel further reinforcing tapes which are anchored by a plastics covering layer that is extruded thereon and pressed thereto.

6 Claims, 3 Drawing Figures

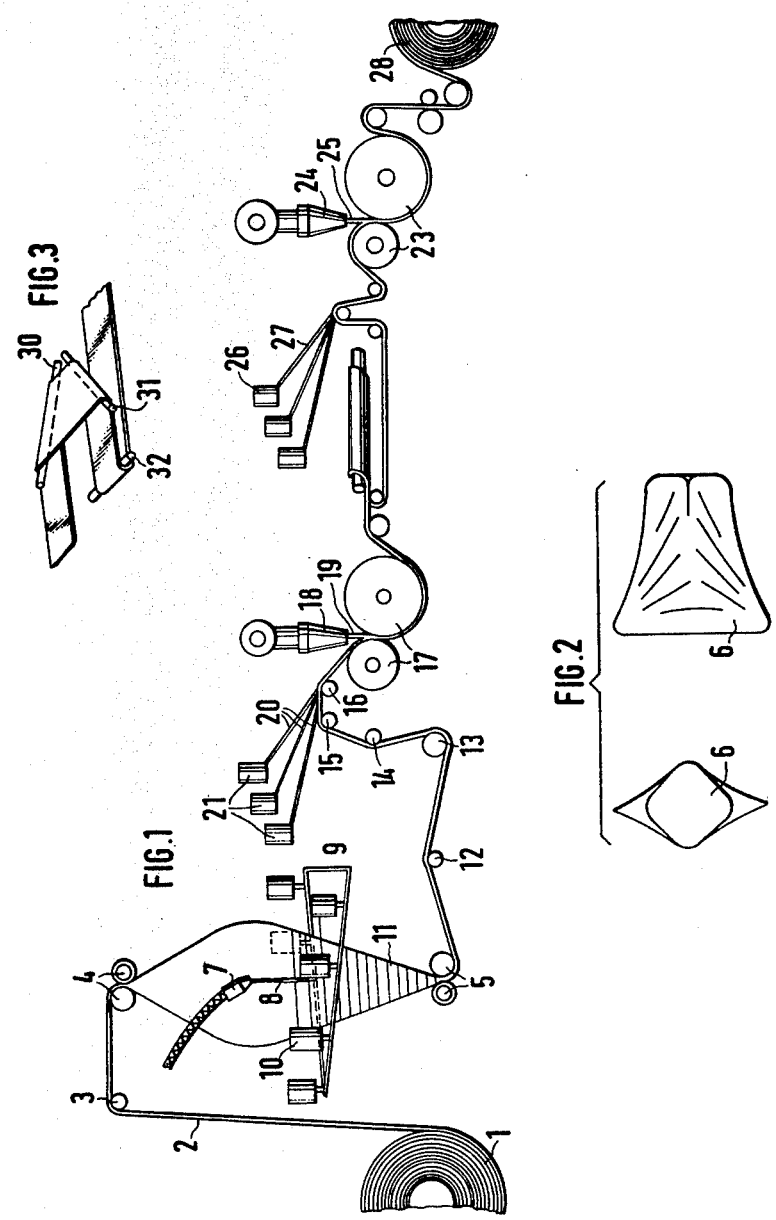

METHOD OF REINFORCING FLATTENED TUBULAR FILM WITH TAPE LAYERS

The invention relates to a method of reinforcing flattened tubular films with tape layers which extend axially to and helically about the tube axis.

For example, for the manufacture of ultra-strong packaging films, ultra-strong sacks and container sacks of large volume, one uses layer-reinforced plastics films, particularly also those in the form of tubular films. Such films reinforced by inserts are produced in that the layers which preferably consist of stretched plastics tapes are connected to a carrier film. The desired strength of the composite film as well as its trouble-free further processing are, however, ensured only if a good connection is ensured between the individual layers to prevent their separation or peeling off and if the connection of the individual layers is not effected by using heat of a temperature exceeding the relaxation temperature of the stretched layer of plastics tapes which would result in an impermissible reduction in the strength of the reinforcing layer.

According to the method for producing reinforced multi-layer laminates of plastics material known from U.S. Pat. No. 2,723,705, a protective layer is first of all wound or applied to a round mandrel and on this there are placed axially extending threads which are subsequently provided with a plurality of layers of glued tapes which are tightly wound in the opposite sense. To produce laminated composite films or plates, the tube is subsequently axially slit. Tubular films cannot be reinforced with this known method because the tube formed from threads and tapes is produced on a mandrel which does not permit the reinforcing layers to be applied to a prefabricated core tube. The manufacture of tubes according to the known method is also expensive because the layers forming the tube must be closely applied side-by-side so that the use of tubes and films made according to the known method would not be economial for packaging purposes.

A similar method for making multi-layer tubular films from molecular orientated thermoplastics is known from DT-OS No. 2 518 341, wherein a tube is first formed in that at least two mono-axially stretched film tapes are slung about a cylindrical mandrel in a criss-cross helical formation and adhere to one another and the tube is subsequently slit open axially.

In a method of reinforcing a core tube made by extrusion with the use of blown-in supporting air as known from German Gebrauchsmuster Specification No. 1 928 736, the tube has reinforcing tapes helically wound or braided around it in the opposite sense at a spacing from the extrusion nozzle in the region of a cooled mandrel which supports the tube and subsequently a protective layer is extruded onto the applied reinforcing tape layer in the region of a second cooled mandrel which is carried by the core of the extrusion nozzle. With the vertically extruded and drawn-off core tube there is the danger that the threads or tapes applied only after adequate solidification of the extruded tube, i.e. beyond its solidification line, will slip because their fixing on the tube beyond the line of solidification is no longer ensured. Further, simple extrusion of a protective layer onto the reinforcing tape layer does not achieve a good connection to the core tube because, by reason of the low adhesion forces, the applied covering layer is poorly anchored so that there is a danger of peeling off and non-uniform loadability of the different layers. The applied reinforcing tape layer must, however, not slip and must not peel off because this would markedly detract from the strength and thus the utility of the reinforced film.

It is the problem of the present invention to provide a method for the subsequent reinforcement of tubular films with tape layers by means of which one can produce ultra-strong composite films with a strong connection of the individual layers.

According to the invention, this problem is solved in a method of the aforementioned kind in that the tubular film pulled off a reel is pulled apart by a core floatingly mounted therein, has reinforcing tapes helically wound thereabout and fixed thereto in the region of the core supporting the tubular film and is subsequently flattened, that spaced parallel tapes are placed on one side of the film and connected thereto together with the helically extending tapes in their region by an extruded-on plastics layer pressed on them, that the tube is subsequently turned, parallel tapes are laid on the opposite tube side and connected thereto with the helically extending tapes in the same way by an extruded and pressed-on plastics layer, and the tubular film is wound up as a reel. According to the method of the invention, the tape layer helically applied to the core tube is presecured to the wall of the tube in a way such that the tapes cannot be displaced relatively to one another before the protective layer is applied which connects the layer to the wall of the tube. By compressing the extruded-on protective layer, a good bond is obtained. The tubular film made by the method of the invention is characterised not only by a uniform pattern of the reinforcing tape layer and thus a uniform strength but in addition a tight bond between the individual layers excludes their separation. The tapes of the reinforcing layer can, for example, consist of polypropylene tapes which have at least a tenfold increase in strength by reason of their stretching. By pressing the extruded-on protective layer to the core film, one can work with temperatures below the relaxation temperature of the stretched tapes so that an impermissible reduction in strength need not be feared.

The coating of flat webs with an extruded-on second layer is known per se from U.S. Pat. No. 3,371,002.

To fix the helically applied tapes to the flattened tube, at least one axially extending adhesive thread can be applied thereto which prevents slipping of the tapes and thus a displacement of the pattern formed thereby.

To fix the helically applied tapes, the flattened tubular film can also be pulled apart by a vertically disposed wedge diverging in the direction of travel in fish-tail formation on which the convolutions of the tapes can be supported.

The axially extending reinforcing tapes can also be placed on the tubular film before the helical tapes are wound thereon so that they are additionally caught and held by the convolutions of tapes.

An example of the invention will now be described in more detail with reference to the drawing, wherein:

FIG. 1 shows the sequence of the method for producing reinforced tubular films in a diagrammatic representation;

FIG. 2 is a plan view and side elevation of the floating core, and

FIG. 3 is a perspective view of turning the film through 180° after it has been coated on one side.

A flattened web 2 of tubular film, such as, polymer film of the type described in U.S. Pat. No. 3,953,557 is withdrawn from a supply reel 1 over take-off rollers (not shown) and led over a direction-changing roller 3 by way of a floating mandrel 6 which is held and carried between superposed roller pairs 4, 5 and it is pulled apart by said mandrel. The mandrel 6 extending vertically between the roller pairs 4, 5 is shown in plan at the left of FIG. 2 and in side elevation at the right. In its upper region it has a cross-section which is round or rectangular with rounded corners corresponding to the pulled-open cross-section of the tube 2 and beyond this it tapers and then diverges downwardly in fish-tail formation in intersecting axes. Through a nozzle 7, an adhesive thread 8, such as, polyethylene of the type described in U.S. Pat. No. 3,008,862, is applied to the outside of the pulled-apart flattened tube 2. This thread serves to anchor the subsequently helically applied tapes. The adhesive thread 8 can consist of a tough adhesive or a hot-melt application. The tapes of the helically applied tape layer 11, which may, for instance, be thermoplastic monofilaments of the type described in French Pat. No. 1,340,285, are withdrawn from rollers 10 mounted on a turret 9 that revolves about the expanded tube. Two turrets may be provided to revolve about the tube in the opposite sense.

In addition to the applied adhesive strip 8, the helically applied tape layer is fixed by the floating mandrel 6 wich diverges in fish-tail formation because the individual convolutions can be supported thereon so that slipping thereof is effectively avoided.

The re-flattened tubular web of film 2 having a layer 11 helically wound thereabout is fed by guide rollers 12 to 16 to a roller pair 17, into the inlet nip of which there pass reinforcing tapes 20, which may, for instance, be thermoplastic monofilaments of the type described in French Pat. No. 1,340,285. The tapes 20 are withdrawn from supply rollers 21, extend axially and parallel to one another at a spacing and lie on the top of the flattened web of tubular film 2. Into the nip of the rollers there is extruded from an extrusion nozzle 18 a plastics layer 19, such as, a polystyrene layer of the type described in U.S. Pat. No. 3,957,940. The layer 19 covers the top of the flattened tubular web of film 2 and lies on the tape layer, the plastics layer being pressed to the top of the tubular film 2 between the roller pair 17.

The one-sidedly coated tubular web of film 2 is subsequently turned through 180° by direction-changing bars 30 to 32 and fed to a further roller pair 23 over guide rollers into the nip of which there run reinforcing tapes 27, which may be formed of the same material as the tapes 20. The tapes 27 are withdrawn from supply rollers 26, extend axially and parallel to one another and lie on the inverted upper side of the flattened tube 2. From an extrusion nozzle 24, a plastics layer 25 which again covers the inverted upper side of the flattened tube 2 is extruded onto the tape layer in the nip of the roller pair 23 and is pressed to the flattened tube 2 between the roller pair 23. The layer 25 can be formed from the same material as the layer 19. The flattened tube reinforced with a tape layer and provided on both sides with covering layers that are extruded on is subsequently wound up to form a reel 28.

What is claimed is:

1. A method of reinforcing an axially-extending tubular film with tape layers which extend axially to and helically about the axis of the tubular film, the method comprising:
    passing tubular film to be reinforced about a core floatingly positioned inside the film so that the film is pulled apart;
    helically winding a reinforcing tape around the pulled apart film while the film is being supported by the core, the reinforcing tape forming a tape layer extending helically about the tube axis;
    flattening the film after the tape has been wound thereabout;
    placing a first plurality of spaced parallel tapes on one side of the flattened film;
    extruding and pressing a first plastics layer onto the parallel tapes so that the parallel tapes are connected to the one side of the flattened film and the reinforcing tape, the first plastics layer forming a tape layer extending axially to the tube axis;
    placing a second plurality of spaced parallel tapes on the other side of the flattened film; and
    extruding and pressing a second plastics layer onto the parallel tapes so that the second plurality of parallel tapes are connected to the other side of the flattened film and the reinforcing tape.

2. A method according to claim 1, further including turning the flattened film 180° about its axis before placing the second plurality of spaced parallel tapes on the other side of the flattened film.

3. A method according to claim 1, further comprising helically winding a plurality of reinforcing tapes around the pulled apart film while the film is supported by the core.

4. A method according to claim 1, further comprising applying at least one axially extending adhesive thread to the tubular film to fix the helically applied tapes thereto.

5. A method according to claim 3, wherein the tubular film is pulled apart by a verticaly disposed wedgelike core diverging in the direction of travel in fish-tail formation to fix the helically applied tapes.

6. A method according to claim 4, wherein the axially extending thread is placed on the tubular film before the reinforcing tape is wound thereon.

* * * * *